United States Patent
Pitts

[11] 3,827,753
[45] Aug. 6, 1974

[54] VEHICLE DUMP BODY WITH AUXILIARY INNER MOVABLE BODY

[76] Inventor: Charlie C. Pitts, 9324 Whitehurst, Dallas, Tex. 75231

[22] Filed: Dec. 4, 1972

[21] Appl. No.: 312,060

[52] U.S. Cl. .................. 298/1 B, 214/82, 298/1 R, 298/14, 298/22 R
[51] Int. Cl. ............................. B60p 1/16, B60p 1/28
[58] Field of Search...... 298/1 B, 1 R, 22 R, 22 AE, 298/22 P, 12, 14, 1 A; 214/82

[56] References Cited
UNITED STATES PATENTS

| | | | |
|---|---|---|---|
| 902,217 | 10/1908 | Egeness | 214/82 |
| 1,288,175 | 12/1918 | Pittman | 298/1 R |
| 3,161,305 | 12/1964 | Ferrari | 214/82 |
| 3,170,578 | 2/1965 | Moreland | 214/82 |
| 3,361,477 | 1/1968 | Pitts | 298/14 |
| 3,626,489 | 12/1971 | Pioch | 298/1 B |
| 3,734,316 | 5/1973 | Worthington | 214/82 |

Primary Examiner—Robert S. Ward, Jr.
Assistant Examiner—Reinhard J. Eisenzopf
Attorney, Agent, or Firm—Wayland D. Keith

[57] ABSTRACT

An elongated dump body for a vehicle which has an auxiliary inner movable body mounted within the elongated dump body. A hydraulic cylinder-plunger means interconnects with the forward portion of the elongated dump body and the auxiliary inner movable body, so as to move a portion of the load rearwardly while the elongated dump body of the vehicle is in a horizontal position. An elevating jack is attached near the forward end of the elongated dump body to elevate the elongated vehicle dump body and the auxiliary movable inner body subsequent to the movement of the auxiliary inner movable body to move a portion of the material therein out at the rear end of the elongated vehicle dump body prior to the elevation of both bodies by the hydraulic jack to an angle to discharge the remaining portion of the material in the body by gravity. Provision is made for scraping a portion of both the sides and floor of the elongated vehicle dump body as the material is moved rearwardly by the auxiliary inner movable body.

5 Claims, 7 Drawing Figures

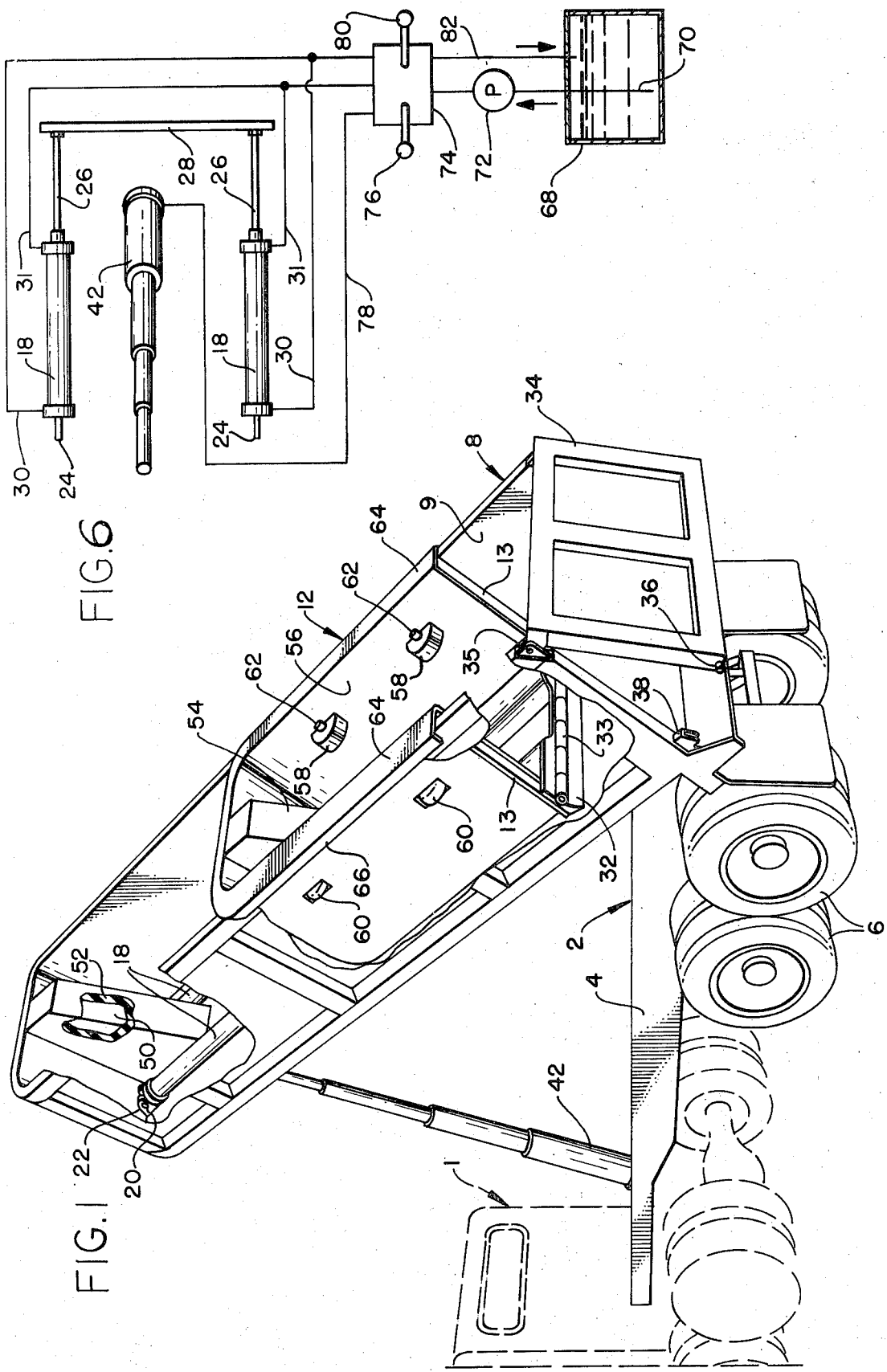

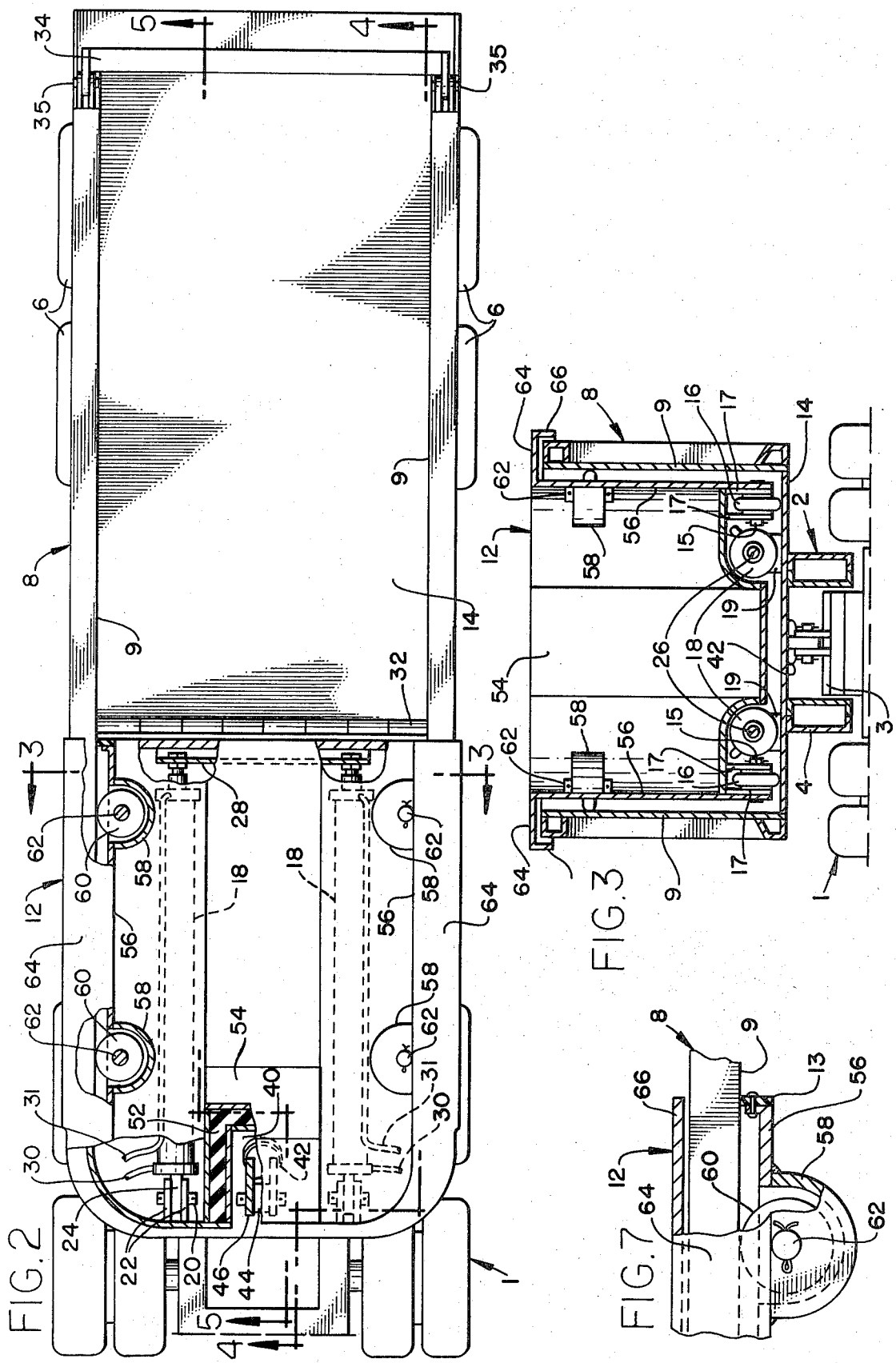

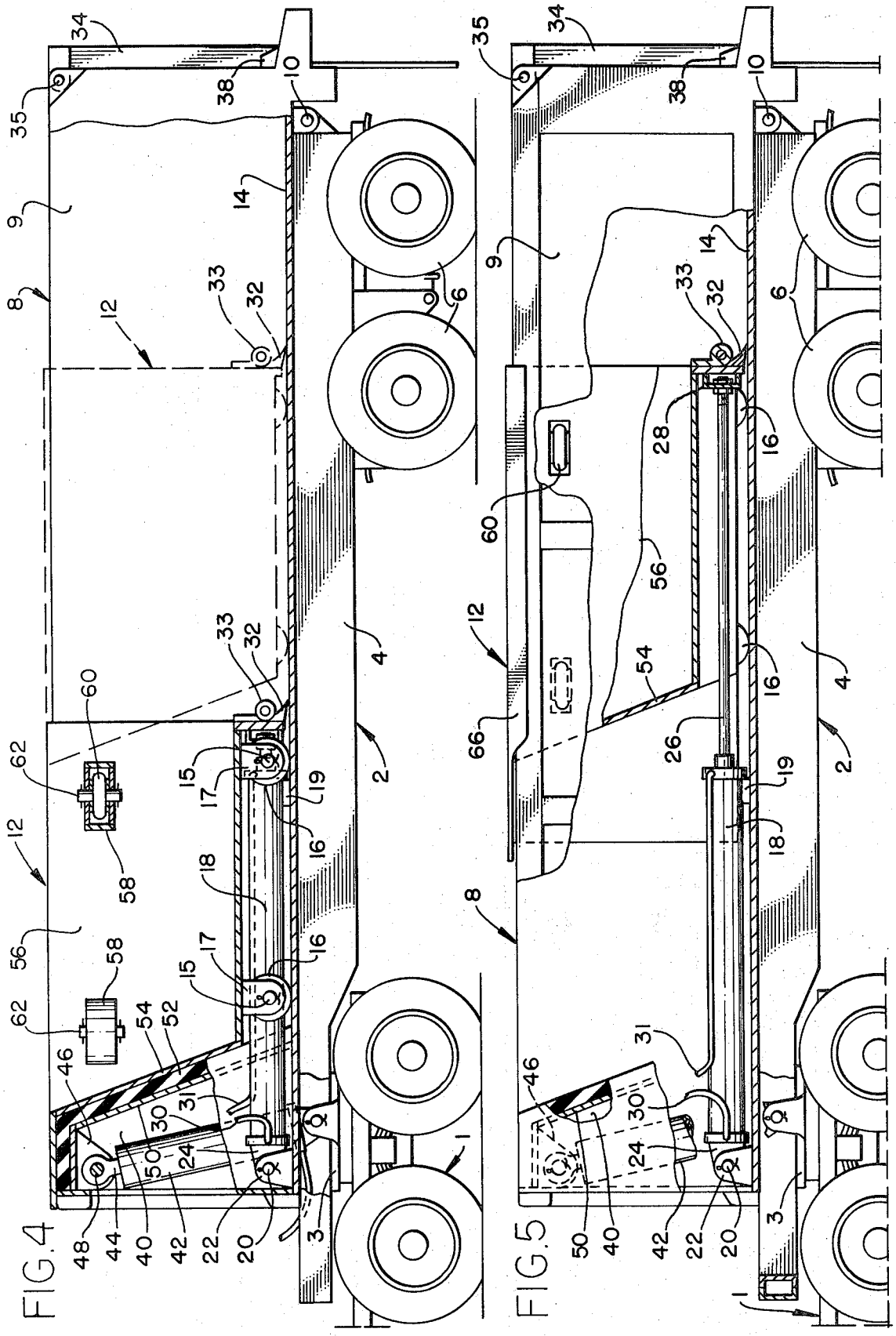

VEHICLE DUMP BODY WITH AUXILIARY INNER MOVABLE BODY

BACKGROUND OF THE INVENTION

This invention relates to dump vehicles, and more particularly to a dump vehicle having a body within a body to enable part of the load, particularly the front portion of the load, to be moved rearwardly while the dump vehicle body is still in horizontal position. After the forward portion of the load has been moved rearwardly, the entire body is elevated at an angle so that the remaining portion of the load slides out of the rear of the dump body. This prevents the load becoming top-heavy, particularly when the vehicle is on angulated terrain.

SUMMARY OF THE INVENTION

Various attachments to dump bodies have been proposed heretofore, to move material within the body rearwardly by pushing the material from the dump body, wherein a separate and independent body was moved into the dump body prior to the dump body being elevated, such as my U.S. Pat. No. 3,361,477, and wherein it was necessary to elevate the body the second time in order to dump all material therefrom.

However, the present invention enables a portion of the material in the dump body to be pushed out of the rear end gate of the dump body while the dump body is still in a horizontal position, and then dumps the remaining portion of the material by elevating the outer and inner bodies, which saves considerable time.

OBJECTS OF THE INVENTION

An object of this invention is to provide an outer dump body or an elongated body such as is usually used on dual tandem trailers, which has an auxiliary or inner body therein, which will push a substantial amount of the material to be dumped out of the rear end gate prior to elevation of the body, and then upon the elevation of the inner and outer bodies, as by a hydraulic jack, the balance of the material is dumped out of the rear portion of the body.

Another object of the invention is to provide an inner auxiliary body within an elongated outer dump body, which inner body is supported on wheels so as to lessen the amount of friction between the portion of the load being pushed and the total amount of load within the vehicle body.

Still another object of the invention is to provide a scraper arrangement on the sides and bottom of the body to move all of the granular material or the like that is being pushed rearward so as to present a clean surface on which the rollers and wheels of the inner auxiliary body will roll.

Still another object of the invention is to provide a fluid-actuated system for moving the inner auxiliary body back and forth within the elongated outer dump body.

Still a further object of the invention is to provide guide rollers on each side of the inner auxiliary body, which are in rolling engagement with the inner walls of the outer body to centralize the inner auxiliary body with respect to the outer body.

Still another object of the invention is to provide a shield upon the inner auxiliary body to prevent granular material from being dumped into the space between the inner and outer bodies.

Still a further object of the invention is to provide shields for the rollers on the auxiliary body, which rollers are mounted on vertical axes and bear against the side walls of the outer body.

Still another object of the invention is to provide at least one double-acting hydraulic fluid-actuated plunger to move the inner auxiliary body relative to the outer dump body.

Still a further object of the invention is to provide an elastomer bumper intermediate the forward end of the outer body and the forward end of the inner body so as to minimize shock.

A final object of the invention is to provide a combination of inner and outer dump bodies which will unload a substantial portion of the load while in a horizontal position so that the remainder of the load is closer to the terrain, and the load is therefore more stable.

BRIEF DESCRIPTION OF THE DRAWINGS

With these objects in mind, and others which will become manifest as the description proceeds, reference is to be had to the accompanying drawings in which like reference characters designate like parts in the several views thereof in which:

FIG. 1 is a perspective view of a portion of a tractor with a tandem dual trailer connected therebehind, and with the dump body elevating jack being shown in full outline in extended position to elevate both the elongated dump body and the inner auxiliary body, with parts being broken away and shown in section and with parts shown in dashed outline to bring out the details of construction, with the inner body being shown in angulated dumping position;

FIG. 2 is a top plan view of the trailer dump body mounted on the rear portion of a tractor with parts shown as broken away and in section to bring out the details of construction;

FIG. 3 is a sectional view taken on line 3—3 of FIG. 2, looking in the direction indicated by the arrows, showing a portion of the rear wheels of the tractor and the supporting structures thereof, and particularly showing the mounting of the inner auxiliary body on wheels;

FIG. 4 is a longitudinal sectional view taken approximately along a line 4—4 of FIG. 2, looking in the direction indicated by the arrows, with parts broken away and with parts shown in elevation and with parts shown in dashed outline to bring out the details of construction and the operation thereof;

FIG. 5 is a sectional view taken along line 5—5 of FIG. 2, looking in the direction indicated by the arrows, showing the hydraulic cylinders attached to the inner auxiliary body in extended relation, with parts broken away and with parts shown in section to bring out the details of construction;

FIG. 6 is a diagrammatic view of the hydraulic system used with the present invention; and FIG. 7 is an enlarged fragmentary view showing a wiper element on the wall of the inner auxiliary body.

DESCRIPTION OF THE INVENTION

With more specific reference to the drawings, the numeral 1 designates generally a tractor such as is used to pull tandem trailers 2 and the like, which may be connected to a trailer 2 by a fifth wheel 3.

The trailer 2 normally has a frame 4 thereunder, or the trailer may be frameless. The wheels 6 are mounted on the trailer body 8 in the usual manner. The frame 4 has the elongated outer dump body portion 8 pivotally mounted thereon by a pivot shaft 10 at the rear of the frame 4 when a frame is used, or it may pivot on the axle of the rearmost wheel 6 when frameless.

The elongated outer dump body 8 has the inner auxiliary body 12 mounted therein for movement along the floor 14 thereof on supporting wheels 16, which wheels are mounted on shafts 15. The shafts 15 pass through the wheels and through downwardly extending lugs 17, as will best be seen in FIGS. 4 and 5.

A pair of elongated cylinders 18 are each pivotally mounted on a pin 20 which pins pass through the respective upstanding pairs of lugs 22 on the trailer dump body 8; and through the respective lugs 24 on cylinders 18. Each cylinder 18 has an outwardly extending plunger 26 that extend rearwardly of the body 8 and connect to an abutment 28 on the rear end of the inner auxiliary body 12, so upon applying hydraulic pressure to conduits 30, the plungers 26 will be moved rearward to move the inner auxiliary body 12 from the position as shown in full outline in FIG. 4 to that shown in full lines in FIG. 5.

Upon the movement of the inner auxiliary body 12 rearwardly, the material in the body 8 will be pushed outward thereby with a knife-like scraper 32 skimming the material off the floor 14.

The wheels 16 are located at each end and on each side of the inner auxiliary body 12. Two of such wheels and a cylinder 18 occupy a tunnel to enable a longer cylinder 18 to be used so that a greater piston area can be had.

By connecting the plunger 26 near the rear end of inner auxiliary body 12, a substantial movement of material may be had to lessen the load in the body 8. While the present auxiliary body 12 is shown to be only about one-third the length of body 8, it can be made longer, if desired, so that a greater amount of the material in the dump body 8 is pushed outward through the end gate 34, which end gate utilizes the conventional pin 36 thereon to engage the locking member 38 in a manner well known in the art of dump vehicles.

It is preferable that a knife-like scraper edge 32 be secured by hinge 33 to the rear face of the lower side of the inner auxiliary body 12, so as inner auxiliary body 12 is moved toward the dump end of the body 8 by directing hydraulic fluid into conduit 31, so no residual granular material or the like will be left on the floor 14. The rear ends of the cylinders 18 are supported on a transverse member 19 so as to maintain the cylinders in horizontal position.

The rear door 34 of body 8 is pivotally connected, by a pin 35, to the upper portion of sides 9 of body 8 so as to hinge outwardly, as indicated in FIG. 1.

The dump body 8 has upstanding sides 9 that are welded or otherwise made unitary with the floor 14, which body has a hollowed portion 40 at the forward end thereof to receive a telescoping jack 42. The telescoping jack 42 pivotally connects a plunger 44 with apertured lugs 46 by a pin 48 passing therethrough and through the upper apertured end of plunger 44. The hollow portion 40 of the body 8 is positioned mediate the width of the vehicle, as will best be seen in FIG. 2 and FIG. 3, so as to receive the telescoping jack 42, as will best be seen in FIGS. 4 and 5.

The hollow portion 40 that receives the telescoping jack 42, when in telescoped condition, has a metal lining 50 therearound, and this lining 50 has an elastomer cushion member 52 thereon to form a shock absorber between the metal lining 50 and the forward end 54 of inner auxiliary body 12. A flexible wiper 13, which may be elastomer, is secured to each rear upstanding edge of the inner auxiliary body 12 so as to be in wiping engagement with the inner face of the wall of body 8.

Upon return of the inner auxiliary body 12 to the position shown in FIGS. 2, 4 and 5, shock will be absorbed by the elastomer member 52 to prevent undue wear on the parts associated with the body. The inner auxiliary body 12 has upstanding sides 56 which have housings 58 thereon, which housings are spaced apart longitudinally of the inner auxiliary body 12 on each side thereof to receive rollers 60 therein. These rollers have axles 62 which pass therethrough and through housings 58 to journal the wheels or rollers 60 thereon for engagement with upstanding sides 9 to guide the inner auxiliary body 12 with respect to the outer body 8.

The upstanding sides 56 of the inner auxiliary body 12 have outwardly extending flanges 64 thereon, which outwardly extending flanges have down-turned lips 66 so as to exclude granular material from entering between sides 9 and sides 56 of inner auxiliary body 12 and sides of body 8.

If the body 8 is rounded, as indicated in FIGS. 1 and 2, the downwardly extending lips extend parallel with the upper side of upstanding sides 9 only for the length of that portion of the side which is straight. However, the outwardly extending flange extends over the entire body at the forward end, as will best be seen in FIG. 2.

The hydraulic system as shown in FIG. 6 shows a hydraulic reservoir 68 with a suction conduit 70 leading therefrom to a pump 72. The pump 72 directs hydraulic fluid through conduit 70 into valve assembly 74 which has a three-way valve 76 therein to direct fluid into conduit 78 leading to the lower end of the single-acting telescoping hydraulic jack 42. The jack 42 is normally positioned on the fifth wheel 3 of the tractor, as will best be seen in FIG. 4. The operation of the valve 76 and the raising and lowering of the body 8 by telescoping jack 42 is conventional.

A second hydraulic valve 80 is a four-way valve which directs hydraulic fluid under pressure to conduits 30 which are parallel and directed to the end of the respective hydraulic cylinders 18 opposite the respective plungers 26 to move the plungers 26 outward. The lever of valve 80, when moved into the opposite position, will direct hydraulic fluid into conduits 31 which will retract plungers 26 with the hydraulic fluid expelled from the other of the conduits being directed through valve assembly 74 into conduit 82 and reservoir 68.

As shown in FIG. 7, the inner auxiliary body 12 has rollers 60 in rolling engagement with the inner walls of body 8. Therefore it is desirable to keep the wall relatively free of foreign matter such as clay, dirt and the like. An elastomer wiper element 13 is securely fixed to the rear vertical edges of each of the upstanding walls of the inner auxiliary body 12 so as to wipe the foreign material from the inner walls 9 as the body 12 returns, and assist in pushing all material ahead of the body 2 upon rearward movement thereof by cylinders 18.

What is claimed is:

1. An unloading device for a vehicle body, which device comprises in combination with the dump body of a vehicle;
   a. an elongated outer body which comprises,
      1. a supporting structure,
   b. a wheeled, inner, auxiliary body at least partially within said elongated outer body, which outer body having a floor and at least three upstanding sides,
      1. the wheels of said auxiliary inner body being in rolling relation with the lower inner surface of the outer body,
      2. wiper elements on the rear portion of the respective sides of said inner, auxiliary body, which wiper elements are in close wiping relation with the inner surfaces of said outer body walls,
      3. a scraper element is secured to the rear lower end of said auxiliary inner body to scrape the upper surface of the floor of the outer body,
   c. power means interconnecting between the forward end of said elongated outer body and said inner auxiliary body to move said inner auxiliary body within the length of said outer body,
      1. an end gate in the rear end of said outer body,
      2. said inner, auxiliary body adapted to be moved rearwardly by said power means to direct material outward through the end gate in said elongated outer body while said outer body is in a horizontal position, and
      3. power means interconnecting the forward end of said elongated outer body and said supporting structure to elevate the forward end of said elongated outer body to discharge material from the ends of said bodies.

2. An unloading device for a vehicle body, as defined in claim 1; wherein
   a. said inner, auxiliary body has vertical axes mounted on each side thereof,
   b. rollers mounted on said vertical axes and being in rolling engagement with the inner surface of said elongated outer body.

3. An unloading device for a vehicle body, as defined in claim 1; wherein
   a. said power means interconnecting between the inner end of said elongated outer body and said inner auxiliary body is a hydraulic cylinder-plunger assembly, and
   b. a source of hydraulic fluid, under pressure, to actuate said cylinder-plunger assembly to move said inner auxiliary body with respect to said elongated outer body.

4. A vehicle body as defined in claim 1; wherein
   a. said scraper element is hingeably attached to said auxiliary body so as to scrape the floor of said outer body, when said inner body is moved rearwardly, but which scraper will hinge upwardly when said inner body moves forwardly.

5. An auxiliary dump body for a vehicle in combination with an outer dump body, comprising;
   a. a frame,
   b. an elongated outer body,
      1. a floor and upstanding sides on said outer body,
   c. a pivot shaft pivotally connecting said frame and said outer body,
   d. an inner movable body,
      1. wheels journaled on the lower side of said inner body for movement along said outer body,
   e. fluid actuated power means connected to said outer body and to said inner body to move said inner body relative to said outer body,
   f. jack means connected near the forward end of said outer body and to said frame for elevating said outer body,
   g. the forward end of said outer body having a hollow formed therein to receive said jack means and to form a projection into the inner body, and
   h. elastomer material covering at least a portion of said projection into said inner body and is intermediate said inner movable body and said outer body.

* * * * *